US010443537B2

(12) United States Patent
Lineton et al.

(10) Patent No.: US 10,443,537 B2
(45) Date of Patent: Oct. 15, 2019

(54) PISTON INCLUDING A COMPOSITE LAYER APPLIED TO A METAL SUBSTRATE

(71) Applicant: FEDERAL-MOGUL CORPORATION, Southfield, MI (US)

(72) Inventors: Warran Boyd Lineton, Chelsea, MI (US); Ross Allen Evers, Tecumseh, MI (US); Greg Salenbien, Britton, MI (US)

(73) Assignee: Tenneco Inc., Lake Forest, IL (US)

(*) Notice: Subject to any disclaimer, the term of this patent is extended or adjusted under 35 U.S.C. 154(b) by 200 days.

(21) Appl. No.: 15/389,862

(22) Filed: Dec. 23, 2016

(65) Prior Publication Data

US 2017/0184052 A1 Jun. 29, 2017

Related U.S. Application Data

(60) Provisional application No. 62/271,425, filed on Dec. 28, 2015.

(51) Int. Cl.
F02F 3/14 (2006.01)
B29C 43/18 (2006.01)
(Continued)

(52) U.S. Cl.
CPC ............ F02F 3/14 (2013.01); B29C 43/18 (2013.01); B29C 43/52 (2013.01); B32B 3/06 (2013.01);
(Continued)

(58) Field of Classification Search
CPC ................. F02F 3/10; F02F 3/12; F02F 3/14
See application file for complete search history.

(56) References Cited

U.S. PATENT DOCUMENTS 3,152,523 A 10/1964 Whitfield et al.
4,245,611 A * 1/1981 Mitchell ............. F02B 23/0603
123/193.6
(Continued)

FOREIGN PATENT DOCUMENTS

EP 0028502 A1 5/1981
GB 2521638 A 7/2015
(Continued)

OTHER PUBLICATIONS

International Search Report, dated Apr. 3, 2017 (PCT/US2016/068633).

Primary Examiner — F Daniel Lopez
Assistant Examiner — Matthew Wiblin
(74) Attorney, Agent, or Firm — Robert L. Stearns; Dickinson Wright, PLLC

(57) ABSTRACT

A piston for a heavy duty diesel engine including a composite layer forming at least a portion of a combustion surface is provided. The composite layer has a thickness greater than 500 microns and includes a mixture of components typically used to form brake pads, such as a thermoset resin, an insulating component, strengthening fibers, and an impact toughening additive. According to one example, the thermoset resin is a phenolic resin, the insulating component is a ceramic, the strengthening fibers are graphite, and the impact toughening additive is an aramid pulp of fibrillated chopped synthetic fibers. The composite layer also has a thermal conductivity of 0.8 to 5 W/m·K. The body portion of the piston can include an undercut scroll thread to improve mechanical locking of the composite layer. The piston can also include a ceramic insert between the body portion and the composite layer.

10 Claims, 8 Drawing Sheets

(51) Int. Cl.
| | |
|---|---|
| B29C 43/52 | (2006.01) |
| F02F 3/26 | (2006.01) |
| B32B 5/00 | (2006.01) |
| B32B 27/00 | (2006.01) |
| F02F 3/00 | (2006.01) |
| F02B 77/02 | (2006.01) |
| F04B 39/00 | (2006.01) |
| F04B 53/14 | (2006.01) |
| F02F 3/12 | (2006.01) |
| B32B 9/04 | (2006.01) |
| B32B 5/02 | (2006.01) |
| B32B 5/16 | (2006.01) |
| B32B 7/04 | (2019.01) |
| B32B 9/00 | (2006.01) |
| B32B 15/098 | (2006.01) |
| B32B 15/14 | (2006.01) |
| B32B 15/16 | (2006.01) |
| B32B 15/18 | (2006.01) |
| B32B 15/20 | (2006.01) |
| B32B 27/06 | (2006.01) |
| B32B 27/42 | (2006.01) |
| B32B 3/06 | (2006.01) |
| B32B 7/05 | (2019.01) |
| B29K 45/00 | (2006.01) |
| B29K 105/12 | (2006.01) |
| B29K 279/00 | (2006.01) |
| B29K 307/04 | (2006.01) |
| B29L 31/00 | (2006.01) |

(52) U.S. Cl.
CPC ............... *B32B 5/00* (2013.01); *B32B 5/02* (2013.01); *B32B 5/16* (2013.01); *B32B 7/04* (2013.01); *B32B 7/05* (2019.01); *B32B 9/005* (2013.01); *B32B 9/041* (2013.01); *B32B 9/045* (2013.01); *B32B 9/047* (2013.01); *B32B 9/048* (2013.01); *B32B 15/098* (2013.01); *B32B 15/14* (2013.01); *B32B 15/16* (2013.01); *B32B 15/18* (2013.01); *B32B 15/20* (2013.01); *B32B 27/00* (2013.01); *B32B 27/06* (2013.01); *B32B 27/42* (2013.01); *F02B 77/02* (2013.01); *F02F 3/0084* (2013.01); *F02F 3/12* (2013.01); *F02F 3/26* (2013.01); *F04B 39/0005* (2013.01); *F04B 53/14* (2013.01); *B29B 2045/00* (2013.01); *B29K 2105/12* (2013.01); *B29K 2279/00* (2013.01); *B29K 2307/04* (2013.01); *B29L 2031/7494* (2013.01); *B32B 2260/021* (2013.01); *B32B 2260/025* (2013.01); *B32B 2260/046* (2013.01); *B32B 2262/0269* (2013.01); *B32B 2262/105* (2013.01); *B32B 2262/106* (2013.01); *B32B 2262/14* (2013.01); *B32B 2264/107* (2013.01); *B32B 2307/30* (2013.01); *B32B 2307/304* (2013.01); *B32B 2307/558* (2013.01); *B32B 2307/732* (2013.01); *B32B 2605/00* (2013.01); *F02F 3/003* (2013.01); *F02F 2003/0061* (2013.01); *F05C 2203/0869* (2013.01); *F05C 2225/06* (2013.01); *F05C 2251/048* (2013.01); *F05C 2253/12* (2013.01); *F05C 2253/16* (2013.01); *F05C 2253/20* (2013.01); *F05C 2253/24* (2013.01)

(56) References Cited

U.S. PATENT DOCUMENTS

| | | | |
|---|---|---|---|
| 4,256,378 A | * | 3/1981 | Prewo .................. C03C 14/002 359/848 |
| 4,306,489 A | | 12/1981 | Driver et al. |
| 4,440,069 A | * | 4/1984 | Holtzberg ............... F02F 3/003 123/193.6 |
| 4,450,610 A | | 5/1984 | Schäper |
| 4,538,562 A | * | 9/1985 | Matsui ................ F02B 23/0696 123/669 |
| 4,679,493 A | | 7/1987 | Munro et al. |
| 4,736,676 A | | 4/1988 | Taylor |
| 5,092,289 A | | 3/1992 | Bloschies et al. |
| 5,122,226 A | | 6/1992 | Minford et al. |
| 2013/0269648 A1 | | 10/2013 | Rehl et al. |
| 2015/0204269 A1 | * | 7/2015 | Hiratsuka ............... F02B 77/11 123/193.3 |

FOREIGN PATENT DOCUMENTS

| | | |
|---|---|---|
| JP | H01313657 A | 12/1989 |
| JP | 2002265272 A | 9/2002 |

* cited by examiner

Section of molded material on scroll threaded aluminum surface.

Section of bowl edge showing excellent profile and net shape molding.

Composite mix ingredients. Left to right; ceramic fiber, graphite fiber, Kevlar and resin.

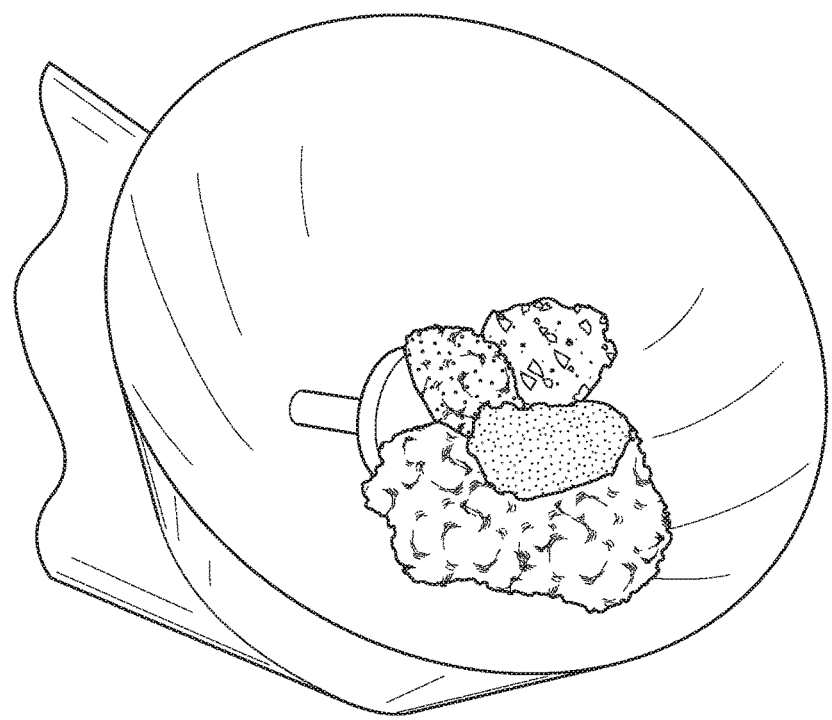
Composite ingredients loaded into mixer chamber.
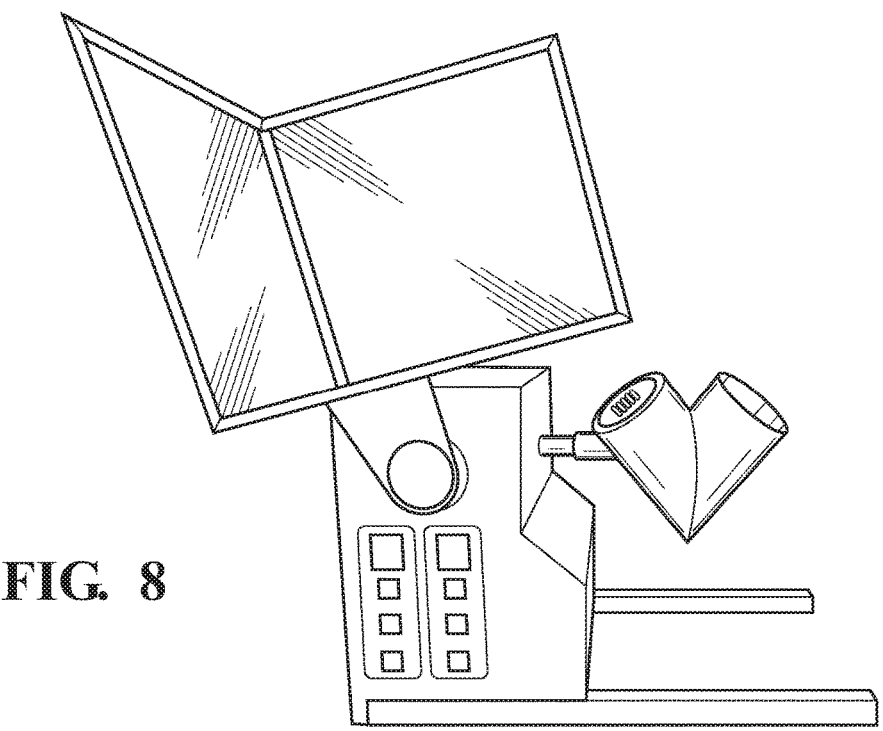
V-mixer on bench.

Composite ingredients after mixing.

Composite mix loaded into mold tool.

Scroll thread cut on aluminum puck with pocket to mimic combustion bowl.

Mix, tooling and puck in press with hot plate in contact with lower tool surface.

Composite outer surface molded on substrate (COSMOS)

PISTON INCLUDING A COMPOSITE LAYER APPLIED TO A METAL SUBSTRATE

CROSS-REFERENCE TO RELATED APPLICATIONS

This U.S. utility patent application claims the benefit of U.S. provisional patent application No. 62/271,425, filed Dec. 28, 2015, the entire contents of which are incorporated herein by reference.

BACKGROUND OF THE INVENTION

1. Field of the Invention

This invention relates generally to pistons for internal combustion engines, such as insulated heavy duty pistons for diesel engines, and methods of manufacturing the same.

2. Related Art

Modern heavy duty diesel engines are being pushed by legislation and customer demands towards increased thermal brake efficiency. The target thermal brake efficiency is currently 46%, but is expected to be up to 60% by the year 2025. Thus, heavy duty pistons with reduced heat flow through the crown, and thus reduced overall energy loss, are desired. Reducing heat flow through the crown allows more energy to be retained in the hotter exhaust gases, and some of this energy can be recovered and converted to useful work by turbo-compounding. For example, certain engine manufacturers desire a mechanism to reduce heat flow through the crown by 50%.

One way to insulate and reduce heat flow through the piston crown is by applying a ceramic coating, for example by thermal spraying. However, such ceramic coatings have a thickness limit, typically 500 microns. Although a greater thickness would provide better insulation, a thicker coating has the risk of spalling and delamination due to the differences in thermal properties between the metal substrate and the coating. Ceramic coatings formed to a thickness greater than 500 microns risk delamination and spalling, even if a metal bond layer is applied before the ceramic coating. This poses a challenge because simulations have shown that reducing heat flow by 50% may not be possible with a ceramic coating if the thickness is less than 500 microns, even though the thermal conductivity of the ceramic coating is low, typically 0.2 to 1.0 W/m·K. Thus, a thicker and/or more robust coating of low thermal conductivity material may be required. The coating material must also adhere well to the top surface of the metal substrate and be able to withstand combustion temperatures of about 800° C. and peak pressures of about 250 bar.

SUMMARY OF THE INVENTION

One aspect of the invention provides a piston for use in an internal combustion engine, such as a heavy duty piston for a diesel engine. The piston includes a body portion formed of metal, and a composite layer applied to the body portion. The composite layer forms at least a portion of a combustion surface of the piston and has a thickness of greater than 500 microns. The composite layer includes a thermoset resin, an insulating component, strengthening fibers, and an impact toughening additive.

Another aspect of the invention provides a method of manufacturing the piston. The method includes applying a composite layer to a body portion formed of metal. The composite layer forms at least a portion of a combustion surface, the composite layer has a thickness of greater than 500 microns, and the composite layer includes a thermoset resin, an insulating component, strengthening fibers, and an impact toughening additive.

The composite layer provides improved insulation of the piston during use in the internal combustion engine, compared to a ceramic coating, by reducing heat flow through the crown. Thus, the composite layer allows more energy to be retained in the hotter exhaust gases, which can be converted to useful work and lead to improved thermal brake efficiency.

BRIEF DESCRIPTION OF THE DRAWINGS

Other Advantages of the Present Invention Will be Readily Appreciated, as the Same Becomes Better Understood by Reference to the Following Detailed Description when Considered in Connection with the Accompanying Drawings Wherein:

FIGS. 6-13 illustrate steps of a method of manufacturing the piston of FIG. 1 according to an example embodiment.

DESCRIPTION OF EXEMPLARY EMBODIMENTS

Figure 1:
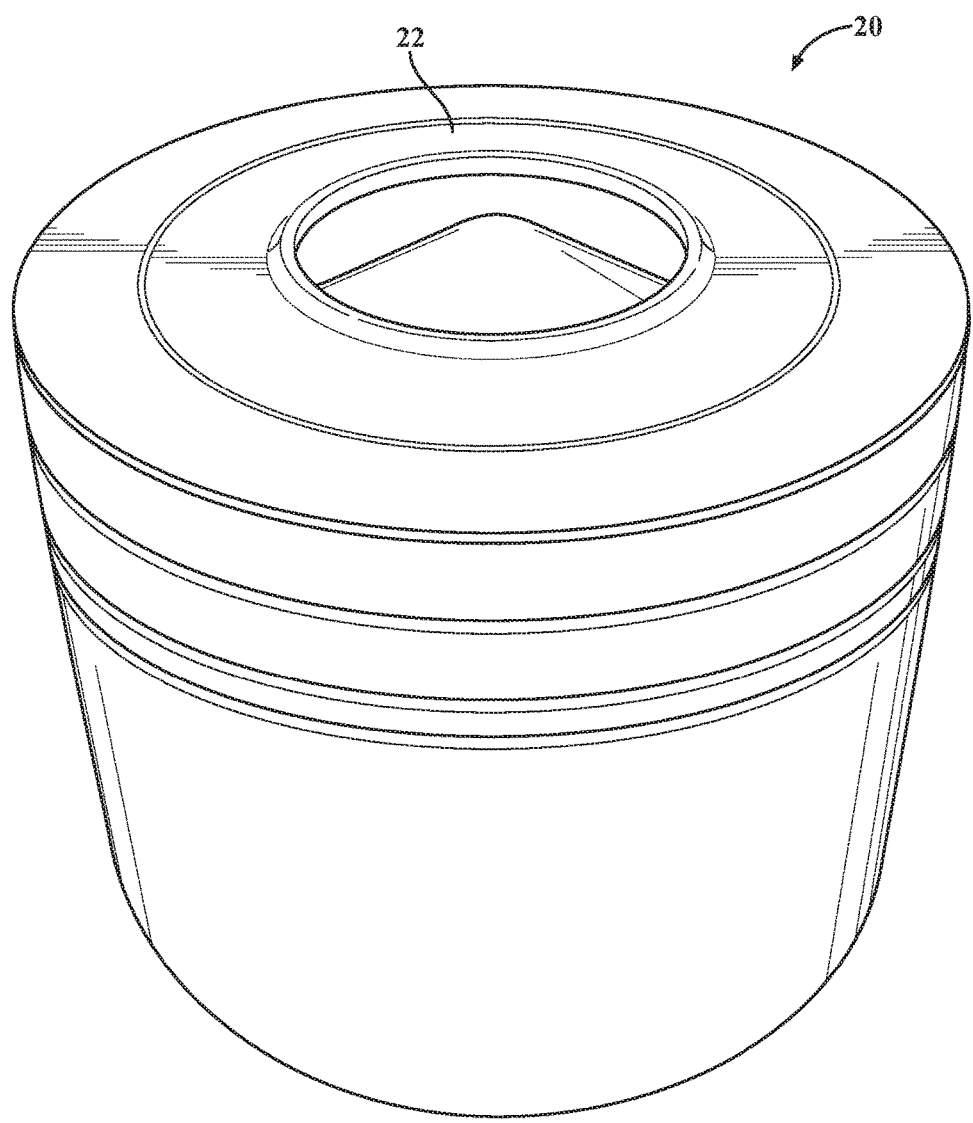
FIG. 1 is a perspective view of a diesel engine piston including a composite layer forming a portion of a combustion surface according to an example embodiment of the invention.

One aspect of the invention provides a piston 20 for use in an internal combustion engine, such as a piston 20 for a heavy duty diesel engine. The piston 20 includes a composite layer 22 molded to an uppermost surface 34 of a body portion 26, also referred to as a substrate, which is formed of metal. The composite layer 22 is formed of ingredients typically used to manufacture automotive brake pads and has a thickness greater than 500 microns. Thus, the composite layer is 22 is expected to reduce heat flow through a crown 32 of the piston 20 by at least 50%. The composite layer 22 is also expected to maintain good adhesion and withstand combustion temperatures of about 800° C., and peak pressures of about 250 bar. The piston 20 including the composite layer 22 according to one example embodiment is shown in FIG. 1. Although the example piston 20 is designed for use in a heavy duty diesel engine, the composite layer 22 could be used in other types of pistons.

Figure 2:
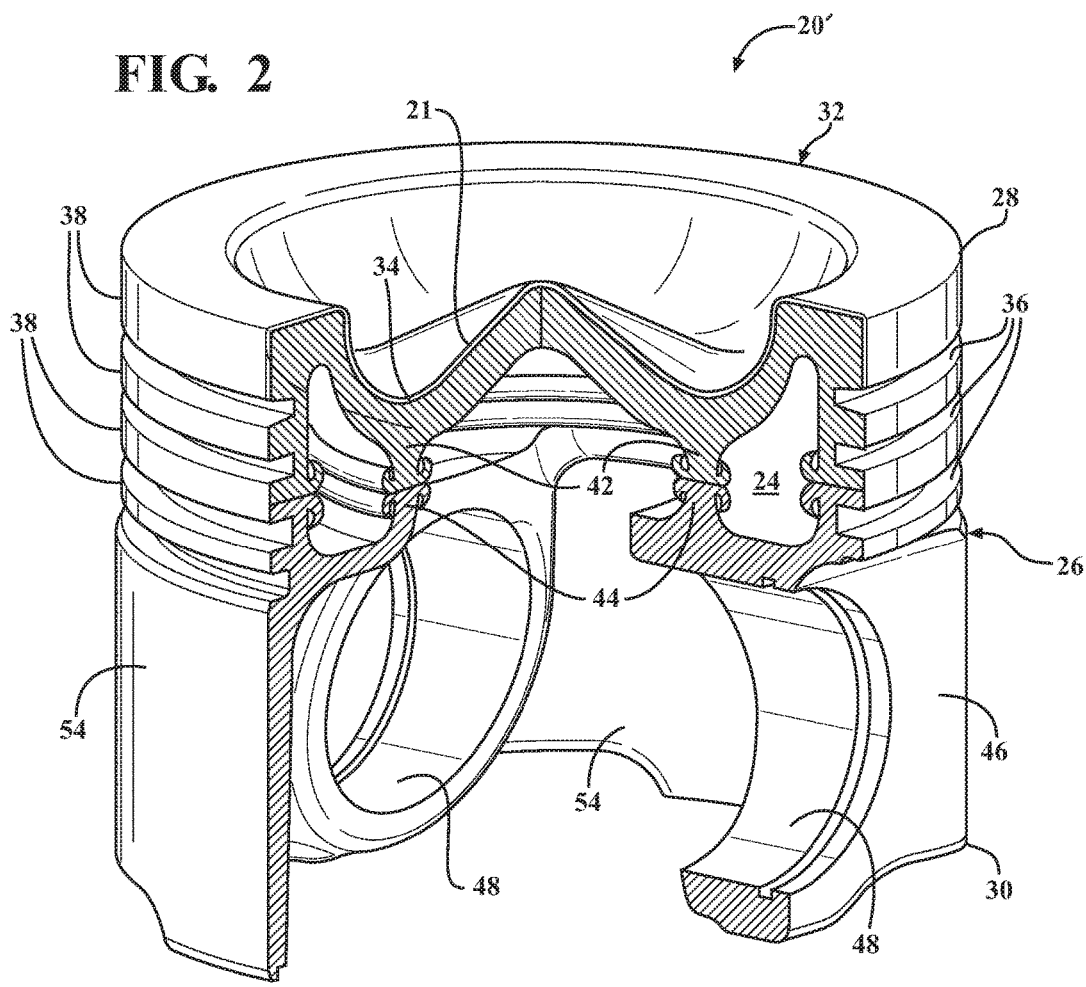
FIG. 2 is a sectional view a comparative diesel engine piston including a ceramic coating applied to a crown of the piston instead of the composite layer.

The composite layer 22 formed of the brake materials can be used in place of a ceramic coating, such as the ceramic coating 21 applied to the comparative piston 20' shown in FIG. 2. In the comparative piston 20' of FIG. 2, the ceramic coating 21 is applied to the uppermost surface 34 and a ring land 38 to reduce heat loss to the combustion chamber and thus increase efficiency of the engine. Thus, the ceramic coating 21 forms a combustion surface which is directly exposed to the extreme conditions of the combustion chamber. The piston 20 of the present invention can have a design similar to the design of the piston 20' shown in FIG. 2.

Figure 3:
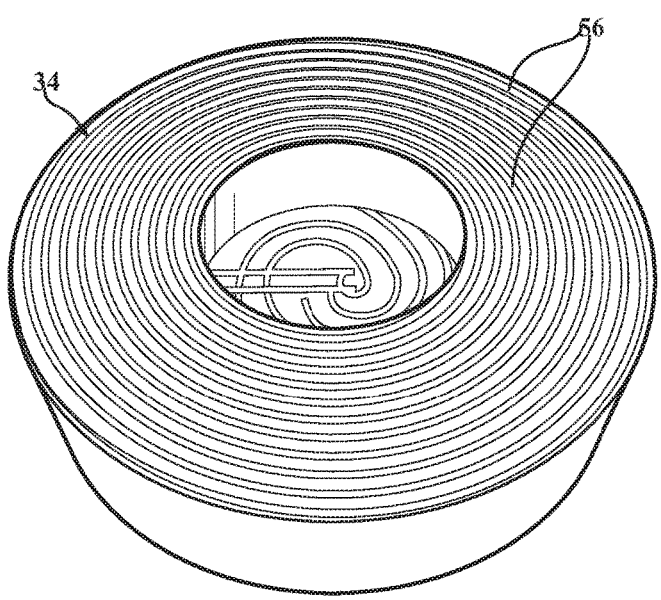
FIG. 3 is a top view of a puck used to simulate a metal body portion of the piston shown in FIG. 1 before applying the composite layer and showing an undercut scroll thread formed along an uppermost surface of the metal body portion.
Figure 4:
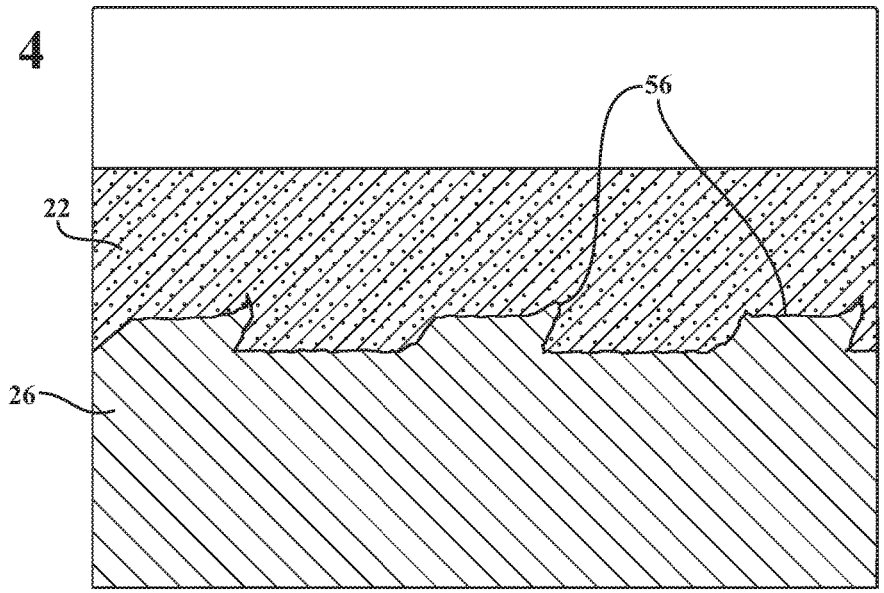
FIG. 4 is an enlarged sectional view of the undercut scroll thread of FIG. 3 after applying the composite layer.
Figure 5A:
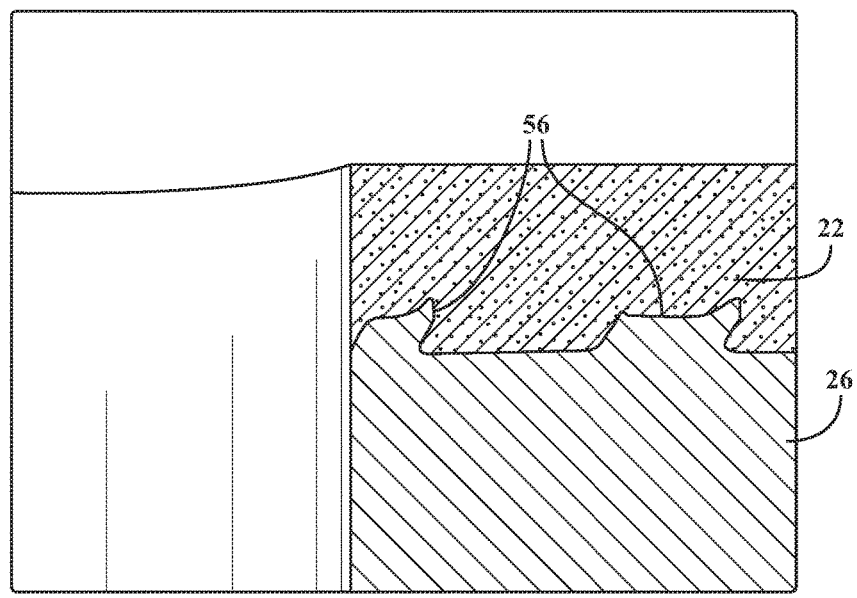
FIG. 5A is another enlarged sectional view of the undercut scroll thread of FIG. 3 after applying the composite layer.

FIG. 3 is a top view of a puck used to simulate a metal body portion 26 of the piston 20 shown in FIG. 1 before applying the composite layer 22. FIGS. 4 and 5 are enlarged sectional views of an undercut scroll thread 56 of the piston 20 of FIG. 3 after applying the composite layer 22. FIGS. 6-13 illustrate steps of a method of manufacturing the piston 10 according to an example embodiment; and FIG. 14 is a sectional view of the finished piston 20 including the composite layer 22 according to an example embodiment.

Figure 14:
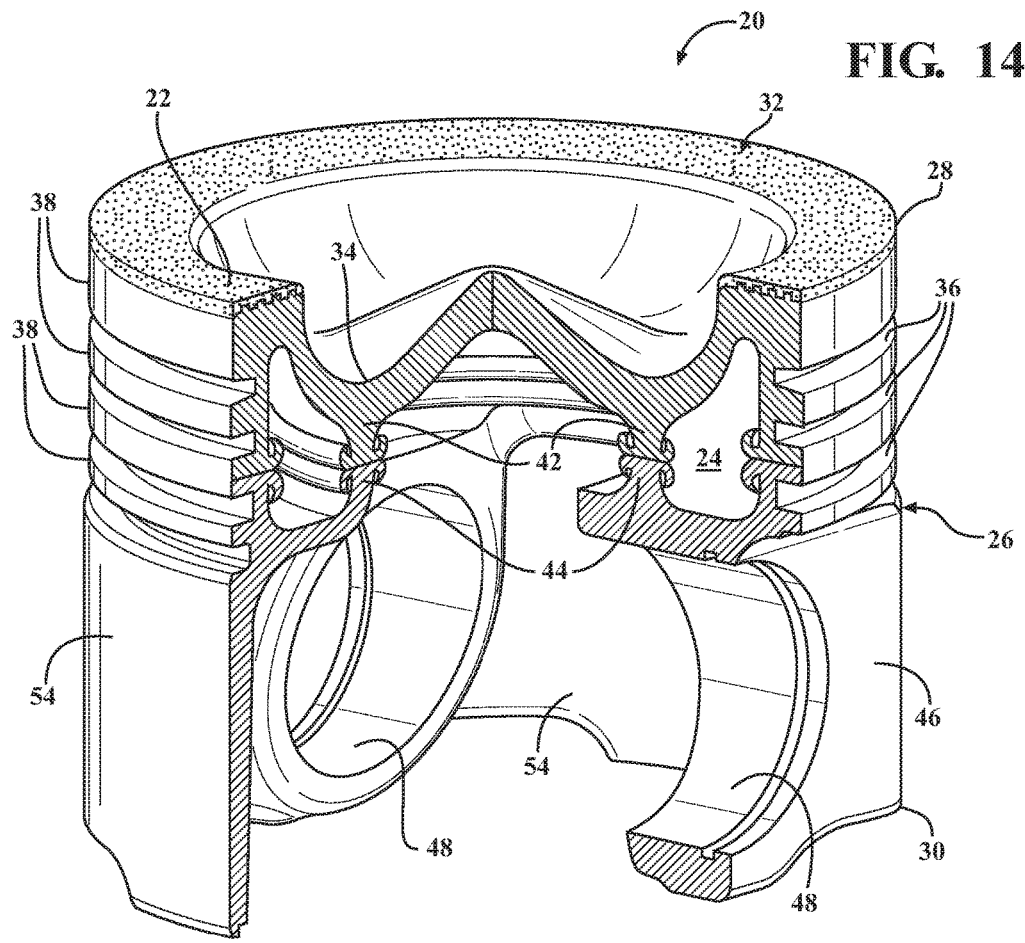
FIG. 14 is a sectional view of the finished piston including the composite layer according to an example embodiment.

The piston 20 of FIG. 14 includes the metal body portion 26 extending around a center axis A and longitudinally along the center axis A from an upper end 28 to a lower end 30. The body portion 26 also includes a crown 32 extending circumferentially about the center axis A from the upper end 28 toward the lower end 30. In the embodiment of FIG. 2, the crown 32 is joined to the remainder of the body portion 26, in this case by welding. The body portion 26 of the piston 20 can be formed of aluminum, steel, or another metal material.

The crown 32 of the piston 20 of FIG. 14 includes the uppermost surface 34 at the upper end 28 which is exposed to hot gasses, and thus high temperatures and pressures, during use of the piston 20 in the internal combustion engine. The uppermost surface 34 defines a combustion bowl extending inwardly and downwardly from a planar outer rim. The crown 32 of the piston 20 also defines at least one ring groove 36 extending circumferentially about the center axis A for receiving at least one ring (not shown). Typically the piston 20 includes two or three ring grooves 36. Ring lands 38 are disposed adjacent each ring groove 36 and space the ring grooves 36 from one another. The piston 20 also includes a cooling gallery 24 extending circumferentially around the center axis A between the crown 32 and the remainder of the body portion 26. In this embodiment, the crown 32 includes an upper rib 42 spaced from the center axis A, the adjacent section of the body portion 26 includes a lower rib 44 spaced from the center axis A, and the upper rib 42 is welded to the lower rib 44 to form the cooling gallery 24. In this case, the ribs 42, 44 are friction welded together, but the ribs 42, 44 may be joined using other methods. The cooling gallery 24 can contain a cooling fluid to dissipate heat away from the hot crown 32 during use of the piston 20 in the internal combustion engine. In addition, cooling fluid or oil can be sprayed into the cooling gallery 24 or along an interior surface of the crown 32 to reduce the temperature of the crown 24 during use in the internal combustion engine.

The body portion 26 of the example piston 20 of FIG. 14 further includes a pair of pin bosses 46 spaced from one another about the center axis A and depending from the crown 32 to the lower end 30. Each pin boss 46 defines a pin bore 48 for receiving a wrist pin which can be used to connect the piston 20' to a connecting rod. The body portion 26 also includes a pair of skirt sections 54 spacing the pin bosses 46 from one another about the center axis A and depending from the crown 32 to the lower end 30.

According to the present invention, however, the ceramic coating 21, which is applied to the piston 20' of FIG. 2 is not used, and instead the composite layer 22 is molded to the uppermost surface 34 of the crown 32. The composite layer 22 is molded to the uppermost surface 34 and forms the entire combustion surface of the piston 20, or a portion of the combustion surface of the piston 20. The composite layer 22 could also be applied to at least one of the ring lands 38. According to one example embodiment, the composite layer 22 is molded along only a portion of the uppermost surface 34 of the crown 32, for example on the outer rim, as shown in FIG. 14.

The piston 20 of FIG. 14 also includes the undercut scroll thread 56 formed in the uppermost surface 34 to improve mechanical locking of the composite layer 22 to the uppermost surface 34. The undercut scroll thread 56 is typically formed in the areas where the composite layer 22 is applied, which can include the combustion bowl and/or the area surrounding the combustion bowl. FIG. 3 is an aluminum puck simulating the metal body portion 26 including the undercut scroll thread 56 formed in the uppermost surface 34. The puck of FIG. 3 has a diameter of 104 millimeters and includes a pocket to simulate the combustion bowl, and the undercut scroll thread 56 is also formed in the pocket. FIGS. 4 and 5 are enlarged sectional views of the undercut scroll thread 56 of FIG. 3 after applying the composite layer 22.

The composite layer 22 is formed of ingredients typically used to form automotive brake pads. The ingredients are blended to form a composite mixture which can be molded directly to the uppermost surface 34 of the body portion 26. The composite layer 22 has a thickness of greater than 500 microns, for example 2 to 3 millimeters. It is expected that the composite layer 22 will withstand engine temperatures and pressures, since brake materials are typically molded at pressures of about 345 bar without damage, and experience temperatures in excess of 600° C. under hard braking conditions when used in service pads of rotors.

The composite layer 22 of the example embodiment has a thermal conductivity of 0.8 to 5 W/m·K, for example about 1 W/m·K. However, the ratio of ingredients can be adjusted to adjust the thermal properties of the composite layer 22. In the example embodiment, the composite layer 22 includes a mixture of thermoset resin, insulating component, strengthening fibers, and impact toughening additive. Different types of thermoset resin could be used to form the composite layer 22, but in the example embodiment, the thermoset resin is a Novalac type phenolic resin. According to the example embodiment, the thermoset resin is present in an amount of 25 weight percent (wt. %) to 35 wt. %, based on the total weight of the composite layer 22. Different types of insulating components could be used to form the composite layer 22, but in the example embodiment, the insulating component is a ceramic fiber or powder. According to the example embodiment, the insulating component is present in an amount of 50 wt. % to 70 wt. %, based on the total weight of the composite layer 22. Different types of strengthening fibers could also be used to form the composite layer 22, but in the example embodiment, the strengthening fibers are formed of graphite. According to the example embodiment, the strengthening fiber is present in an amount of 1 wt. % to 10 wt. %, based on the total weight of the composite layer 22. Different types of impact toughening additives could also be used to form the composite layer 22, but in the example embodiment, the impact toughening additive is fibrillated Kevlar®, which is an aramid pulp of highly fibrillated chopped synthetic fibers. According to the example embodiment, the impact toughening additives is present in an amount of 1 wt. % to 10 wt. %, based on the total weight of the composite layer 22. For example, the composite layer 22 can be formed of a mixture including 10.4 grams Novalac phenolic resin, 17.9 grams Superwool® 607® ceramic fibers, 0.9 grams of ¼ inch graphite fibers, and 0.6 grams crushed Kevlar®. The example mixture provides a composite layer 22 having a thickness of 2 millimeters when applied to the 104 millimeter diameter aluminum puck shown in FIG. 3. The composite layer 22 formed of the example mixture also has a thermal conductivity of about 1 W/m·K.

Figure 5B:
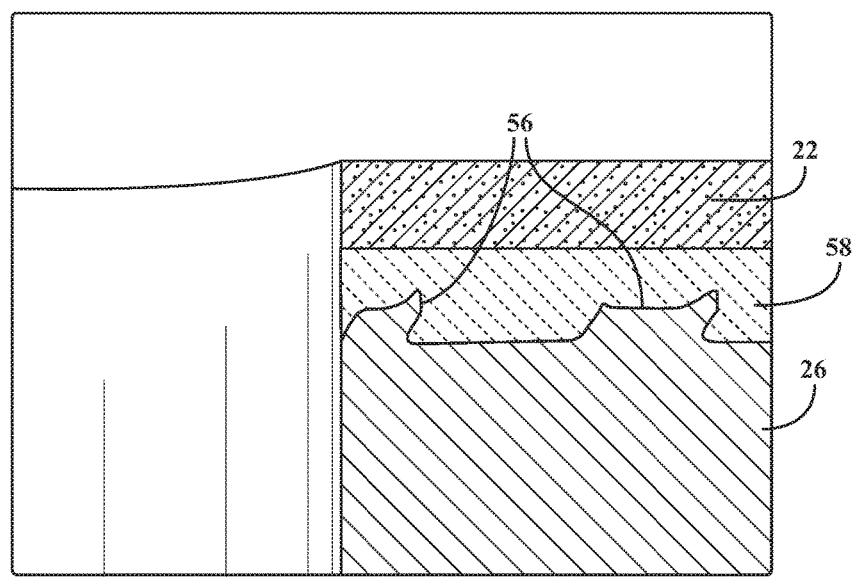
FIG. 5B is an enlarged sectional view of the undercut scroll thread of FIG. 3 after applying the composite layer, wherein a ceramic insert is located between the composite layer and the metal body portion.

To further improve the performance of the piston 20, a ceramic insert 58 can be located between the uppermost surface 34 the metal body portion 26 and the composite layer 22, as shown in FIG. 5B. The ceramic insert 58 can be placed in a desired location or locations along the uppermost surface 34 the metal body portion 26, for example the areas opposite fuel plumes where a flame front typically contacts the bowl region, or other locations subjected to the most aggressive conditions in the combustion chamber. According to one embodiment, the ceramic insert 58 is formed of an alumina ceramic.

Another aspect of the invention provides a method of manufacturing the piston 20 with the composite layer 22 forming at least a portion of the combustion surface. The method generally includes molding a composite mixture of ingredients typically used to form brake pads to the uppermost surface 34 of the piston body portion 26. FIGS. 6-13 illustrate steps of an example method used to form the example piston 20 of FIG. 1. However, other methods could be used.

Figure 6:
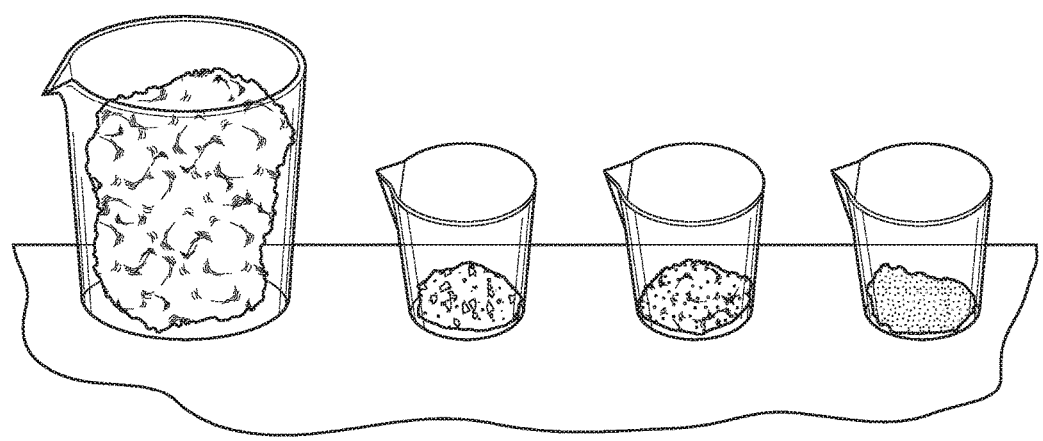

The method begins by obtaining the composite mixture, or preparing the mixture from raw ingredients. Only thermal and structural ingredients are needed, as there is no need for friction modifiers or non-useful fillers which are used in brake pad materials. In the example embodiment, the method includes obtaining the thermoset resin, insulating component, strengthening fibers, and impact toughening additive, as shown in FIG. 6, and then loading the ingredients into a mixing chamber, as shown in FIG. 7. In the example embodiment, the thermoset resin is a Novalac type phenolic resin, the insulating component is a ceramic fiber or powder, the strengthening fibers are formed of graphite, and the impact toughening additive is fibrillated Kevlar®. For example, the mixture can include 10.4 grams Novalac phenolic resin, 17.9 grams Superwool® 607® ceramic fibers, 0.9 grams of ¼ inch graphite fibers, and 0.6 grams crushed Kevlar®.

Figure 9:
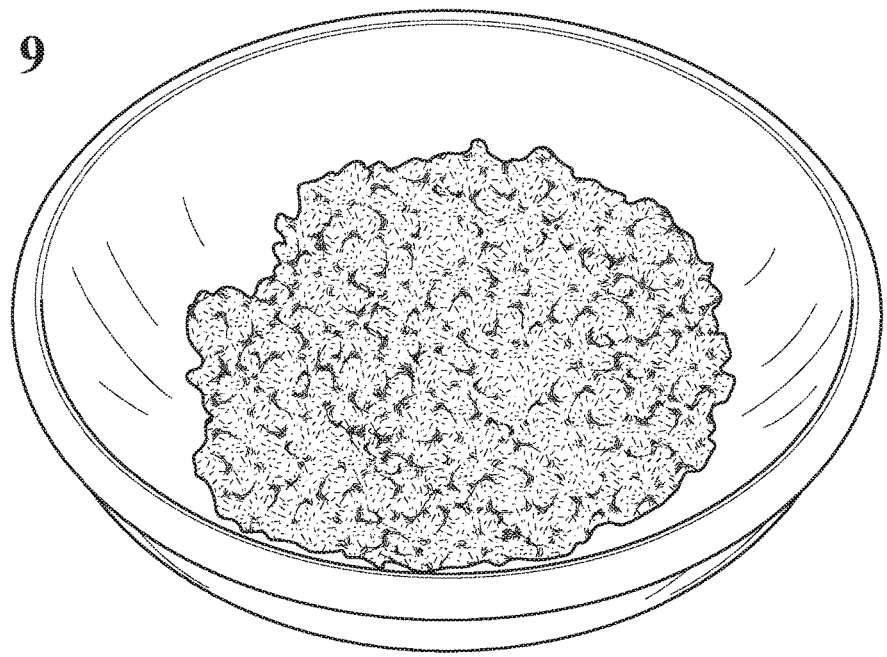
Figure 10:
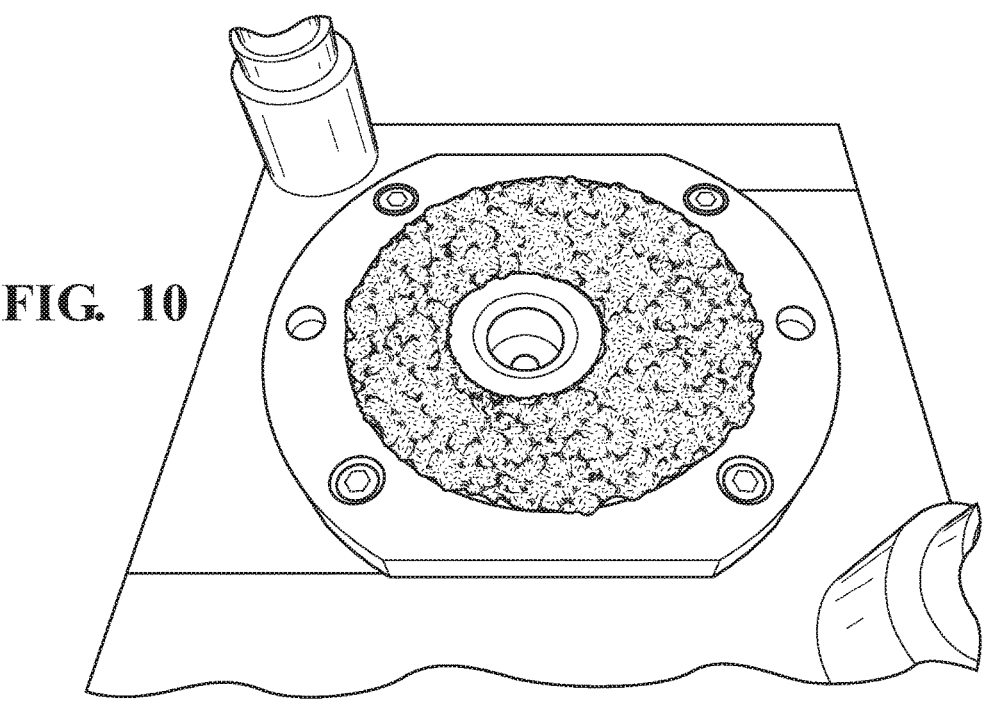

FIG. 8 shows a mixer containing the ingredients of the example embodiment. The mixer of FIG. 8 is a V-mixer, but the mixer could alternatively be a plough share mixer or another type of mixer. FIG. 9 shows the composite mixture after the mixing step. After obtaining or preparing the composite mixture, the composite mixture is loaded into a mold tool, as shown in FIG. 10. The mold tool includes a press that can apply up to 2.5 tons/square inch, or 5000 psi to a surface area. The mold tool also includes a means of heating, such as platens that can reach up to 250° C., which allows for a cure and flow cycle that causes the composite mixture to flow, B-stage, and then cure.

Figure 11:
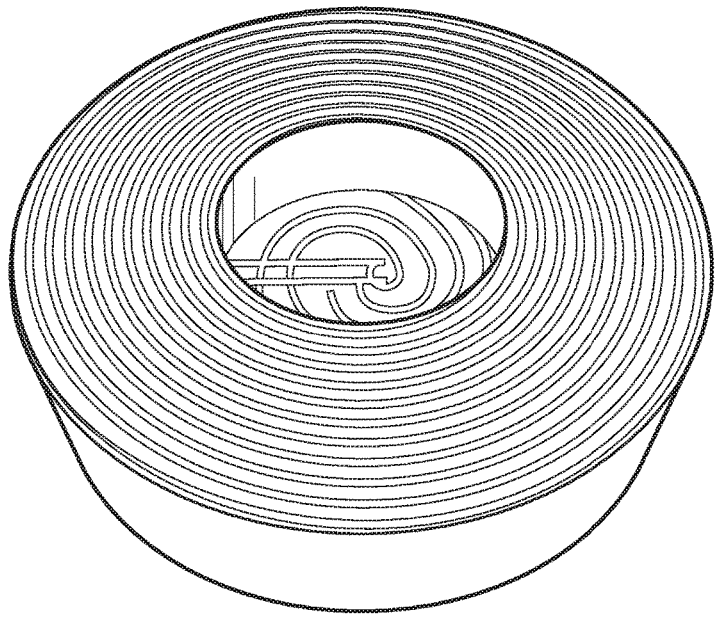
Figure 12:
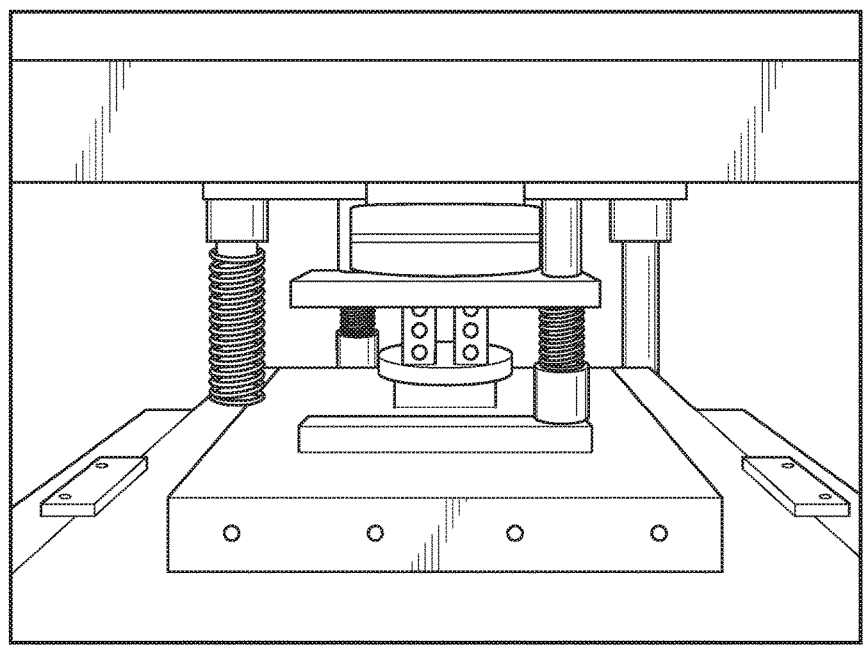
Figure 13:
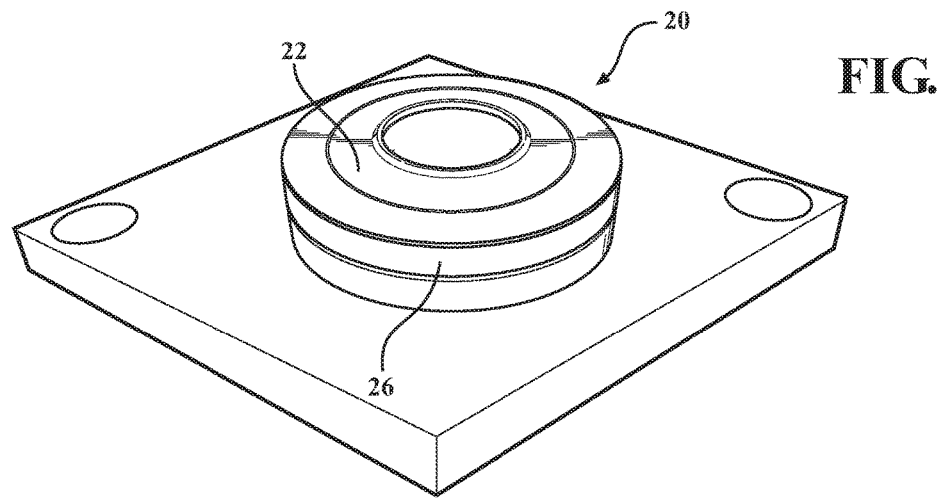

The method further includes obtaining or providing the body portion 26 of the piston 20, which is formed of metal, such as aluminum or steel. This step typically includes forming the undercut scroll thread 56 along the uppermost surface 34 of the body portion 26, as shown in FIG. 11, in preparation for the molding step. The body portion 26 is then placed in a molding tool, along with the composite mixture, as shown in FIG. 12.

The method next includes molding the composite mixture to the uppermost surface 34 of the body portion 26 to form the composite layer 22. The molding step, specifically the flow and cure cycle, is modified from that of brake pad, block, or shoe material manufacturing in order to prevent problems that can arise from gas liberated during cure of the resin matrix material. For example, in brake pads, cracks along the center plane of the brake pad form as the cure gases force their escape.

The improved method of the present invention includes a B-staging operation, which is a very low degree of curing at 120 to 130° C. for 5 to 60 minutes, for example about 15 minutes, to reduce the tendency for the resin to rapidly emit gas while curing. During the B-staging step, the resin is still able to melt and flow along the uppermost surface 34 and conform to the shape of the undercut scroll thread 56, but does not fully cure. In the example embodiment, the method includes heating the mold tool to a temperature of 130° C. by the heated platen, loading the composite mixture and the piston body portion 26 into the mold tool, and then compressing the mixture and body portion 26 together at 1 ton/square inch. The B-staging step then includes holding the compressed mixture and body portion 26 at 130° C. for 15 minutes.

After the B-staging step, the method includes increasing the temperature of the compressed composite mixture and body portion 26 for a period of time so that the composite mixture cures and forms the composite layer 22. In the example embodiment, the method includes increasing the temperature for 10 to 60 minutes, for example 11 minutes, to reach a temperature of 180 to 250° C., for example about 200° C. in the mold tool. The method then includes holding the composite mixture and body portion 26 at the elevated temperature, for example 200° C. for an additional 15 minutes, before removing the piston 20 from the mold tool. The temperature of the curing step of the present method is higher than that typically used to form brake pads, which is less than 180° C. Thus, the resin has a greater cure and better mechanical properties. As shown in FIG. 14, the finished piston 20 includes the composite layer 22 securely molded to the uppermost surface 34 of the body portion 26.

Other methods can alternatively be used to form the piston 20 including the composite layer 22. For example, the method could be optimized to reduce the cycle time. As an alternative to loosely filling the mold tool with the composite mixture, the composite mixture could be first molded into a preform insert and then B-staged such that a flat disc-shaped insert with a hole for the combustion bowl is formed. The insert is then dropped into a mold assembly, and the metal body portion 26 is placed on top of the insert before curing. This alternative method may be better suited for a production environment.

To further improve the performance of the piston 20, the method can optionally include disposing the ceramic insert 58 along the uppermost surface 34 of the metal body portion 26 before molding the composite mixture to the ceramic insert 58 and the metal body portion 26. For example, the ceramic insert 58 can be formed of alumina ceramic and placed in locations typically subjected to aggressive conditions in the combustion chamber.

The composite layer 22 formed by the method of the present invention has a thermal conductivity similar to thermal spray ceramic coatings, but can be formed to a thickness of greater than 500 microns. Thus, the composite layer 22 is more effective at insulating the piston 20 during used in the internal combustion engine. In addition, the composite mixture can be molded into very complex shapes without line-of-sight issues which oftentimes exist in plasma spray or high velocity oxygen fuel (HVOF) spray of ceramic coatings.

Obviously, many modifications and variations of the present invention are possible in light of the above teachings and may be practiced otherwise than as specifically described while within the scope of the claims.

The invention claimed is:

1. A piston, comprising:
a body portion formed of metal;
a composite layer applied to said body portion and forming at least a portion of a combustion surface;
said composite layer having a thickness of greater than 500 microns;
said composite layer including a thermoset resin, an insulating component, strengthening fibers, and an impact toughening additive;
said thermoset resin being present in an amount of 25 wt. % to 35 wt. %, based on the total weight of said composite layer;
said insulating component being present in an amount of 50 wt. % to 70 wt. %, based on the total weight of said composite layer;
said strengthening fibers being present in an amount of 1 wt. % to 10 wt. %, based on the total weight of said composite layer; and
said impact toughening additive being present in an amount of 1 wt. % to 10 wt. %, based on the total weight of said composite layer.

2. The piston of claim 1, wherein said composite layer has a thermal conductivity of 0.8 to 5 W/m·K.

3. The piston of claim 1, wherein said composite layer has a thickness of 2 millimeters to 3 millimeters.

4. The piston of claim 1 including an insert formed of ceramic disposed between said body portion and said composite layer.

5. The piston of claim 4, wherein said insert includes alumina.

6. The piston of claim 1, wherein an uppermost surface of said body portion includes an undercut scroll thread, and said composite layer is applied to said undercut scroll thread of said uppermost surface.

7. The piston of claim 1, wherein said thermoset resin is a phenolic resin, said insulating component is ceramic, said strengthening fibers are graphite, and said impact toughening additive is an aramid pulp of fibrillated chopped synthetic fibers.

8. A piston, comprising:
a body portion formed of metal;
a composite layer applied to said body portion and forming at least a portion of a combustion surface;
said composite layer having a thickness of greater than 500 microns;
said composite layer including a thermoset resin, an insulating component, strengthening fibers, and an impact toughening additive; wherein said thermoset resin is a phenolic resin, said insulating component is ceramic, said strengthening fibers are graphite, and said impact toughening additive is an aramid pulp of fibrillated chopped synthetic fibers.

9. A piston, comprising:
a body portion formed of metal;
a composite layer applied to said body portion and forming at least a portion of a combustion surface;
said composite layer having a thickness of greater than 500 microns;
said composite layer including a thermoset resin, an insulating component, strengthening fibers, and an impact toughening additive;
wherein said metal of said body portion is aluminum or steel;
said body portion includes a crown extending circumferentially about a center axis from an upper end toward a lower end;
said crown presents an uppermost surface at said upper end;
said uppermost surface includes a combustion bowl extending inwardly and downwardly from a planar outer rim;
said uppermost surface includes an undercut scroll thread;
said composite layer is disposed on said undercut scroll thread of said uppermost surface;
said composite layer has a thermal conductivity of 0.8 to 5 W/m·K;
said thermoset resin is a phenolic resin, said insulating component is a ceramic, said strengthening fibers are graphite, and said impact toughening additive is an aramid pulp of fibrillated chopped synthetic fibers;
said thermoset resin is present in an amount of 25 wt. % to 35 wt. %, based on the total weight of said composite layer; said insulating component is present in an amount of 50 wt. % to 70 wt. %, based on the total weight of said composite layer; said strengthening fibers are present in an amount of 1 wt. % to 10 wt. %, based on the total weight of said composite layer; and said impact toughening additive is present in an amount of 1 wt. % to 10 wt. %, based on the total weight of said composite layer; and
said composite layer has a thickness of 2 millimeters to 3 millimeters.

10. The piston of claim 9 including an insert formed of ceramic disposed between said composite layer and said uppermost surface of said body portion, and said ceramic insert including alumina.

* * * * *